United States Patent

Leverett

[15] 3,690,569

[45] Sept. 12, 1972

[54] GRANULAR POLYTETRAFLUOROETHYLENE OF GOOD MOLDABILITY AND APPARENT BULK DENSITY

[72] Inventor: Glenn Frederick Leverett, Vienna, W. Va.

[73] Assignee: E. I. du Pont de Nemours and Company, 2, Wilmington, Del.

[22] Filed: Sept. 24, 1970

[21] Appl. No.: 75,235

[52] U.S. Cl. .........................241/17, 241/21, 241/29, 260/92.1
[51] Int. Cl. .......B02c 19/00, B02c 23/00, C08f 3/24
[58] Field of Search .......241/17, 21; 29/30; 260/92.1

[56] References Cited

UNITED STATES PATENTS 3,115,486  12/1963  Weisenberger............260/92.1
3,535,301  10/1970  Groppelli..................260/92.1
3,513,144   5/1970  Kometani..................260/92.1
3,150,834   7/1964  Doyle......................241/21 X Primary Examiner—Wayne A. Morse, Jr.
Attorney—Edwin Tocker

[57] ABSTRACT

Granular polytetrafluoroethylene is ground to a particle size of about 20–50 microns, and slurried in water at a temperature less than 40° C. to increase the apparent bulk density of the polymer without a substantial change to the moldability index and particle size thereof.

9 Claims, No Drawings

GRANULAR POLYTETRAFLUOROETHYLENE OF GOOD MOLDABILITY AND APPARENT BULK DENSITY

This invention relates to granular polytetrafluoroethylene and more particularly to a process for increasing the apparent bulk density thereof.

The polymerization of tetrafluoroethylene to the granular type of polytetrafluoroethylene (as distinguished from the aqueous dispersion or fine powder type) is disclosed in U.S. Pat. No. 2,393,967 to Brubaker. Briefly, the polymerization is conducted by pressuring gaseous tetrafluoroethylene into an agitated aqueous medium containing dissolved polymerization initiator and a buffer. The agitation of the medium causes the polymer as it is formed to settle to the bottom of the reaction vessel, and the resultant polymer is obtained in the form of relatively large particles.

Early in the development of granular polytetrafluoroethylene, it was found that for general purpose molding these large polymer particles had to be comminuted. While comminution did improve the ability of the polymer to be used as a molding powder, it introduced the problem of powder flow; i.e., the molding powder would not flow uniformly to fill a mold. In addition, the quality of the molded article was lower then desired for many applications.

The poor powder flow character of this early comminuted polymer was greatly improved upon by the invention of Weisenberger disclosed in U.S. Pat. No. 3,115,486, which involved comminuting the granular polymer to particle sizes in the range of 200 to 700 microns (wet sieve) followed by slurrying the resultant powder in water at elevated temperatures of 40 to 70°C. The poor moldability character of the early comminuted powder was greatly improved upon by comminuting to still smaller particle sizes, such as less than 50 microns (wet sieve), as disclosed in U. S. Pat. No. 2,936,301 to Thomas and Wallace. Unfortunately, while the Weisenberger invention improved powder flow, the quality of the resultant molded article was not as high as desired. Similarly, while finer grinding such as disclosed by Thomas and Wallace improved the quality of the molded article, the powder of the finer ground powder was not as good as desired.

It was next discovered that by slurrying the finer ground granular polymer (as prepared by the Thomas and Wallace method) in water at temperatures above 40°C., a powder with both good powder flow and better moldability was obtained. This discovery is described in British Pat. No. 1,033,638 to Du Pont (see also U. S. Pat. No. 3,366,615). However, the quality of the molded article, although improved, was still not as good as that which was obtained by only fine grinding (such as by the invention of Thomas and Wallace). This was due to the increase in particle size that occurred during the slurrying in hot water.

One of the effects of the slurrying treatment of the powder in the aforementioned British patent was to increase the apparent bulk density of the powder. This had the beneficial result of requiring less mold volume for a given weight of powder. To illustrate the significance of this benefit, the earliest granular polytetrafluoroethylene molding powder required a 40 foot high mold cavity to produce a molded article 4 foot high. In the treatment disclosed in the British patent, the increased apparent bulk density of the powder was obtained at the expense of giving up some quality in the molded article due to the increase in particle size.

The present invention involves the discovery that by slurrying the finer ground granular polytetrafluoroethylene in water at a temperature less than 40°C., the resultant molding powder not only increases in apparent bulk density, but also retains its original moldability and particle size.

The expression "moldability" as used herein to refer to the quality of the article molded from granular polytetrafluoroethylene can be quantitatively defined by such direct measurements as tensile strength and elongation. More often, however, such indirect tests as void content, dielectric strength, or specific gravity of the molded article relative to the standard specific gravity of the resin are used. These tests measure the degree of compactness of the article, with the degree of compactness being directly related to the strength and toughness of the article. Moldability will be defined herein by the term "moldability index" which is the difference between the standard specific gravity (SSG) of the polytetrafluoroethylene, as determined by the procedure of ASTM D–1457–56T, and the specific gravity of a sample of the same powder preformed at 1,000 psig. instead of the 5,000 psig. pressure of the ASTM procedure, the difference between the two specific gravities being multiplied by 1,000 to obtain the "moldability index." The smaller the moldability index, the closer together are the specific gravities involved, which in turn indicates the lower porosity and thus, the higher quality of the molded article.

The "apparent bulk density" of the molding powder is obtained by the procedure of ASTM D–1457–56T. Units are in grams per liter.

The particle size disclosed herein (unless otherwise indicated) of the molding powder is the average or $d_{50}$ particle size diameter in microns as determined by the "Micromerograph" technique wherein the air sedimentation rate of a representative sample of the molding powder is determined using the procedure and apparatus disclosed in U.S. Pat. No. 2,597,099, and this is converted to particle size distribution using Stoke's Law which relates particle size to rate of fall. By plotting the cumulative weight percent of material versus particle diameter a "bell curve" is obtained with the apex of the curve representing the $d_{50}$ particle diameter or average particle diameter. The air sedimentation test is carried out in a column providing a free-fall distance of eight feet. The distribution of particle diameters is such that usually at least about 70 percent by weight of the powder diameters fall within ±20 microns of the $d_{50}$ value. The $d_{50}$ particle size determined by this technique is about the same as would be obtained for the wet sieve size procedure disclosed in the Thomas and Wallace patent.

The polytetrafluoroethylene starting material is the granular type of polymer. This type of polymer can be prepared by a procedure such as described in the Brubaker patent, wherein the polymer has a specific surface area of less than 3 square meters per gram. The starting polymer can also be made by the modification of the Brubaker process disclosed in U.S. Pat. No.

3,245,972 to Anderson, Edens, and Larson wherein nuclei are produced in the early stage of the granular polymerization process and these nuclei lead to the formation of granular polytetrafluoroethylene having an increased specific surface area of from 3–9 square meters per gram. One method for nucleation is to aid to the polymerization medium from 50 to 500 ppm. (based on the total weight of the aqueous medium) of telogenically inactive fluorinated dispersing agent at the beginning of the polymerization reaction. Another method for making the polytetrafluoroethylene starting material, to obtain a still greater increase in specific surface, is minimize or eliminate the presence of buffer, which is typically an ammonium compound, that is present in the polymerization medium, as disclosed in German Pat. Publication No. 1,950,767 (U.S. Ser. No. 766,314, filed Oct. 9, 1968 by Esker). Specific surface area of the polymer is measured by nitrogen absorption, for example, by the procedure disclosed in Chapter XII of W. E. Barr and V. J. Anhorn, *Scientific and Industrial Glass Blowing and Laboratory Techniques*, Instruments Publishing Company (1949).

The particle size of the starting polymer will depend on the polymerization process by which it is made; generally the particle size will be 500 microns (wet sieve) or greater. In any event, the polymer is comminuted to a particle size of less than 100 microns and generally in the range of 10 to 75 microns but preferably to a particle size of 20 to 50 microns, using any comminuting equipment which is capable of producing the small particle sizes desired. For example, suitable equipment include micronizers, jet-o-mizer, and the apparatus disclosed in the Thomas and Wallace patent.

Apparatus such as the Fitzmill disclosed in the Weisenberger patent and Waring blenders which have a bladed stirrer operating at 13,000 rpm, as disclosed in the Anderson, Edens, and Larson patent, are incapable of producing this result.

The comminution can be carried out dry or with the polymer contained in an aqueous medium. Preferred comminution temperatures are in the range of 0° to 40°C., but preferably at a temperature of less than 15°C. Generally the apparent bulk density of the comminuted polymer will be from 200 to 425 grams per liter.

Following comminution, the finely ground powder is added to water which is at a temperature of less than 40°C., and the resultant combination is agitated. By agitation is meant that turbulence is produced in the combination of polymer and water, whereby the polymer particles, which are not water wet, disperse within the water, probably producing particle-to-particle contact, to form a slurry. Equipment for producing this result, typically baffled tanks equipped with a stirrer, are well known in the art.

If the comminution is carried out wet, i.e., on a slurry of the powder in water, the slurry can be merely passed from the cutter to a slurrying tank operating under the aforementioned condition of agitation. In any event, sufficient water is present during the agitation step to form the slurry. Typically, from 3 to 20 parts of water will be present for each part of polymer powder, all parts being by weight.

The residence time of the polymer powder in the slurrying tank should be sufficient to increase the apparent bulk density of the polymer powder to be in excess of 400 grams per liter, and preferably in excess of 450 grams per liter. Depending on the polymer concentration in the water and degree of turbulence, the residence time required to reach the bulk density desired will generally be at least 0.5 minute, and usually no significant benefit is obtained by slurrying for more than 10 hours. The slurrying can be conducted batchwise or continuous by having the inlet and outlet to the agitation equipment used appropriately sized and located to prevent fresh feed to the tank from short-circuiting the desired agitation time.

The temperature of slurrying is critical. Preferably, the slurrying temperature is no greater than 30°C. The slurrying can also be carried out at a water temperature of less than 19°C. which is the temperature of transition of the triclinic form (19°C. and below) to the hexagonal form. At the relatively low temperatures of 30°C. and less, the agitation apparently does not agglomerate the particles into larger particles which are stable in subsequent handling. This is contrary to the agglomeration results disclosed in the aforementioned British patent upon slurrying at temperatures of 40° to 70°C. The lowest slurrying temperature is about 0°C. where the formation of ice interferes with the agitation.

The slurrying process of the present invention can also be operated in the range of 30°C. to less than 40°C. with marginal improvement, depending on the time of slurrying. At short slurrying times, most, if not all, the original moldability index and particle size of the comminuted polymer is retained; but the ability to retain moldability index and particle size diminishes as the slurrying temperature approaches 40°C. As the slurrying time decreases (to save the original moldability index), there is a smaller increase in apparent bulk density. By extending the slurrying time, some further increase in apparent bulk density with only minor loss of moldability (increase in moldability index) and increase in particle size can be obtained. The degree of loss that can be tolerated will depend on the moldability index and particle size of the starting comminuted polymer and properties desired in the final product. Typically, the agitation will be conducted under conditions at which neither the moldability index nor particle size increase by more than 20 percent based on their starting values. More often than not, especially at slurry temperatures of no greater than 30°C., one or both of these parameters will not increase and may decrease.

Following slurrying, the water and powder can be separated from one another and the powder can be dried at a temperature less than the sintering temperature (327°C.) of the resin. The usual drying technique is to expose the powder to circulating air heated to a temperature up to 300°C.

Alternatively, the wet powder can be passed to the same or different comminuting equipment for one or more additional cycles of comminution and slurrying. The comminution in each successive cycle has a small effect on reducing the particle size of the polymer relative to the effect of the first comminution, but each comminution increases the moldability (decreased the moldability index) of the powder while lowering its apparent density, and the slurrying step in each cycle increases the apparent bulk density. Generally, a better combination of bulk density and moldability index is obtained by subjecting the polymer powder to two or more cycles of comminution and slurrying than to prolong the comminution an slurrying of a single cycle for an equivalent amount of time.

The resultant polymer has good powder flow and is useful in molding applications in general in the same way as the granular polytetrafluoroethylene made heretofore. The powder is especially useful in making large molded articles because the increased bulk density of the powder requires a smaller mold volume.

Specific embodiments of the invention are as follows (parts and percents are by weight unless otherwise indicated):

EXAMPLE 1

The granular polytetrafluoroethylene used in this Example was prepared following the procedure of Example 10 of the aforementioned U.S. Pat. application Ser. No. 766,314 and had a specific surface area of 3.5 square meters per gram.

The cutter used was a Taylor Stiles (Model No. TS–06) wet cutter with 6 inch rotor blades operating at a rotor speed of 9,600 rpm. and equipped with a 60 P screen having a 0.17 mm wide opening across the discharge of the cutter.

The polymer was mixed with water at 8°C. and at that temperature was passed through the cutter at a water flow rate of 1,360 liters per hour and polymer feed rate of 227 kilograms per hour. The resultant finely ground polymer had a particle size of 35 microns, an apparent bulk density of 417 grams per liter and a moldability index of 41.

The finely ground polymer was mixed with ten parts of water per part of polymer and agitated in a slurry tank for 6 hours at 10°C. The slurry tank was equipped with vertical baffles to increase turbulence and jacketed to control the temperature. The tank had a diameter of 45.7 cm., a height of 45.7 cm., the agitator blades were rectangular and four in number each measuring 22.9 cm. in diameter and 5.1 cm. in height, with a 45° pitch. The agitator speed was 400 rpm. The resultant slurried fine powder had a particle size of 33 microns, an apparent bulk density of 517 grams per liter, and a moldability index of 42.

EXAMPLE 2

The wet finely ground powder obtained in Example 1 after draining off excess water was recycled to the cutter of Example 1 and re-cut under the same conditions as described in the example, except that the 60P screen was replaced by an 80P screen having openings 0.13 mm. wide. The resultant re-cut finely ground powder had a particle size of 29 microns, an apparent bulk density of 435 grams per liter, and a moldability index of 22 which was about one-half of the moldability index obtained for the first cycle of comminution and slurrying.

EXAMPLE 3

The wet, re-cut, finely ground powder of Example 2 was recycled to the slurry tank of Example 1 and slurried under the same conditions as described in Example 1. The resultant fine powder had a particle size of 30 microns, an apparent bulk density of 501 grams per liter, and a moldability index of 18, illustrating retention of the good moldability index of the polymer and improvement in apparent bulk density.

EXAMPLE 4

In this Example, the granular polytetrafluoroethylene was the same as the starting material used in Example 1. The polymer was finely ground in the type of mill described as a "Hurricane Mill" in col. 4 and 5 of the Thomas and Wallace patent, using nitrogen instead of air and operating at about 10°C. to give finely ground powder having a particle size of 36 microns, an apparent bulk density of 370 grams per liter and a moldability index of 7.

The powder was divided up into 200 gram samples for determining the effect of slurrying temperature. Each sample was added to one liter of water and slurried in a 2-liter kettle equipped with 1.3 cm. wide vertical baffles and a four blade agitator with 7.6 cm. diameter × 1.3 cm. pitched blades rotating at 1,500 rpm. The temperature of the water and agitation time and results are shown in the following table:

| Sample No. | time(min.) | temp.,°C. | Apparent Bulk Density (gms/liter) | Moldability Index | Particle Size (microns) |
| --- | --- | --- | --- | --- | --- |
| a | none | — | 370 | 7 | 36.2 |
| b | 60 | 10 | 414 | 4.4 | 32.1 |
| c | 5 | 30 | 474 | 5.8 | 38.1 |
| d | 20 | 30 | 477 | 7.0 | 40.6 |
| e | 20 | 35 | 500 | 12.1 | 45.2 |
| f | 15 | 40 | 504 | 19.0 | 44.1 |
| g | 15 | 50 | 519 | 22.0 | 92.1 |

These results show even at prolonged slurrying at low temperature (10°C.), neither the moldability index nor particle size is adversely affected as compared to slurrying for shorter times at higher temperatures (30°C. and above). These results also show the general increase of moldability index with slurrying temperature at 35°C. and above, even at relatively short slurrying times, indicating an increasing lack in quality of the molded article obtained from the slurried powder.

In each of the foregoing Examples, prior to measuring the parameters of the polymer, the polymer was dried in a circulating hot air oven at 180°C. for four hours.

As many apparently widely different embodiments of this invention may be made without departing from the spirit and scope thereof, it is to be understood that this invention is not limited to the specific embodiments thereof except as defined in the appended claims.

I claim:

1. A process for increasing the apparent bulk density of granular polytetrafluoroethylene comprising comminuting the polytetrafluoroethylene to have a particle size of less than 100 microns and agitating the resultant polytetrafluoroethylene in an aqueous medium at a temperature of less than 40°C.

2. The process of claim 1 wherein the temperature is no greater than 3°C.

3. The process of claim 1 wherein the particle size is from 10 to 75 microns.

4. The process of claim 1 followed by at least one additional cycle of comminution and agitation as set forth in claim 1.

5. The process of claim 1 wherein the comminution is carried out at a temperature in the range of 0° to 40°C.

6. The process of claim 5 wherein the comminution is carried out at a temperature of less than 15°C.

7. The process of claim 1 wherein the agitation is sufficient to increase the apparent bulk density of said polytetrafluoroethylene to be in excess of 450 g/l.

8. The process of claim 1 wherein the agitation is conducted so that neither the moldability index nor particle size 23 so of the polytetrafluoroethylene increases by more than 20 percent.

9. The process of claim 1 wherein before comminution the polytetrafluoroethylene has a particle size of at least 500 microns.

* * * * *